United States Patent [19]
Martin et al.

[11] Patent Number: 5,915,775
[45] Date of Patent: Jun. 29, 1999

[54] METHOD AND APPARATUS TO REDUCE SIDE IMPACT FORCES

[75] Inventors: James B. Martin, Oxford; Jack H. Atabak, Clarkston; Dennis L. Peters, Dearborn Heights; Saad M. Abouzahr, Highland; Andrea Sjue, Carlton, all of Mich.

[73] Assignee: Chrysler Corporation, Auburn Hills, Mich.

[21] Appl. No.: 08/797,319

[22] Filed: Feb. 10, 1997

[51] Int. Cl.⁶ ................................................. B62D 23/00
[52] U.S. Cl. .................... 296/35.2; 296/35.1; 296/188; 296/189
[58] Field of Search .................. 296/35.1, 35.2, 296/188, 189

[56] References Cited

U.S. PATENT DOCUMENTS

| | | | |
|---|---|---|---|
| 3,622,195 | 11/1971 | Lautenbach | 296/35.1 |
| 3,718,364 | 2/1973 | Fischer et al. | 296/189 |
| 3,848,886 | 11/1974 | Feustel et al. | 296/35.2 |
| 3,851,912 | 12/1974 | Grosseau | 296/35 R |
| 3,881,767 | 5/1975 | Klees | 296/35 R |
| 3,981,530 | 9/1976 | Yamanaka et al. | 296/35.2 |
| 4,046,415 | 9/1977 | Klees et al. | 296/35.1 |
| 4,059,304 | 11/1977 | Yamanaka | 296/35.2 |
| 4,290,235 | 9/1981 | Jahnle et al. | 40/502 |
| 4,311,204 | 1/1982 | Shupert | 296/35.1 |
| 4,559,252 | 12/1985 | Motoda et al. | 428/57 |
| 4,601,367 | 7/1986 | Bongers | 188/376 |
| 4,732,803 | 3/1988 | Smith, Jr. | 428/212 |
| 4,819,980 | 4/1989 | Sakata et al. | 296/35.1 |
| 4,836,321 | 6/1989 | Baumann | 180/232 |
| 4,879,165 | 11/1989 | Smith | 428/212 |
| 5,342,106 | 8/1994 | Fischer | 296/204 |
| 5,388,884 | 2/1995 | Keehner et al. | 296/35.1 |
| 5,635,562 | 6/1997 | Macolm | 296/189 |
| 5,641,933 | 6/1997 | Kim | 296/189 |

*Primary Examiner*—Joseph D. Pape
*Assistant Examiner*—Kiran B. Patel
*Attorney, Agent, or Firm*—William J. Coughlin

[57] ABSTRACT

A method and apparatus for reducing side impact forces in a body-on-frame vehicle includes a plurality of impact reducing members connected between the body and the frame of the body-on-frame vehicle. One embodiment of the impact reduction member includes a flexible cord preferably constructed from polymer fibers. The cord is looped around a portion of the frame and a portion of the body. Another embodiment comprises a self-securing polymer sleeve. The impact reducing members further may be protected by a sheath. Connecting members for connecting the impact reducing members to the frame include an arm and a plurality of bolts connecting the arm to the frame. The impact reducing members reduce the side impact forces during a collision.

20 Claims, 4 Drawing Sheets

METHOD AND APPARATUS TO REDUCE SIDE IMPACT FORCES

BACKGROUND OF THE INVENTION

1. Field of the Invention

The present invention relates to body-on-frame type vehicles, and, more specifically, to a method and apparatus for attaching the body of a body-on-frame vehicle to the frame to reduce side impact forces present in such a vehicle during a side impact collision.

2. Description of the Related Art

A body-on-frame vehicle is one in which the body is a separate component from the frame. FIG. 1 shows a typical body-on-frame vehicle 10. Body 12 is attached to frame 14 via a plurality of bolts 16, which sit on mounts 18. This is in contrast to a vehicle that comprises unitized body design, in which the body and frame are integral. This is shown in FIG. 2, which shows a typical unitized body vehicle 20. Most automobiles are constructed using a unitized body design and most trucks, utility vehicles and sport utility vehicles are constructed using body-on-frame design. As can be seen in FIG. 1, the body of a body-on-frame vehicle typically is bolted to the frame via bolts which pass through rubber mounts placed between the body and the frame. These mounts can be carefully selected to tune the vehicle's ride, enabling a typically stiff-suspensioned vehicle such as a truck or a utility vehicle to achieve better ride performance. Body-on-frame vehicles can be more easily tuned than unibody vehicles to achieve both good handling and smooth ride, regardless of the weight of the cargo. Additionally, most body-on-frame vehicles (such as trucks) currently are not subject to side impact requirements, but will be in the future. Due to their construction, however, they offer less resistance to side impact forces than unitized designs. Thus, a need exists for an apparatus and a method to reduce side impact forces present in a body-on-frame vehicle during a collision.

SUMMARY OF THE INVENTION

Accordingly, it is an object of the present invention to provide a method and apparatus for reducing side impact forces in a body-on-frame vehicle.

It is another object of the present invention to provide a method and apparatus for reducing side impact forces which is simple in construction.

It is yet another object of the present invention to provide a method and apparatus for reducing side forces which can withstand the heat typically present during a vehicle painting process.

Accordingly, disclosed and claimed herein is a method and apparatus for reducing side impact forces in a body-on-frame vehicle wherein a plurality of impact reducing members are connected between the body and the frame of the body-on-frame vehicle. The impact reducing members act to reduce the side impact forces during a collision. One embodiment of the impact reduction member comprises a biaxially oriented polymer cord further comprising Kevlar™. Another embodiment comprises a self-securing polymer sleeve. The impact reducing members further may be protected by a sheath. Also disclosed are connecting means for connecting the impact reducing members to the frame comprising an arm and a plurality of bolts connecting the arm to the frame.

The details of the apparatus and method of the present invention, both as to structure and operation, can best be understood in reference to the accompanying drawings, in which like reference numerals refer to like parts and in which:

DETAILED DESCRIPTION OF THE INVENTION

Figure 1:
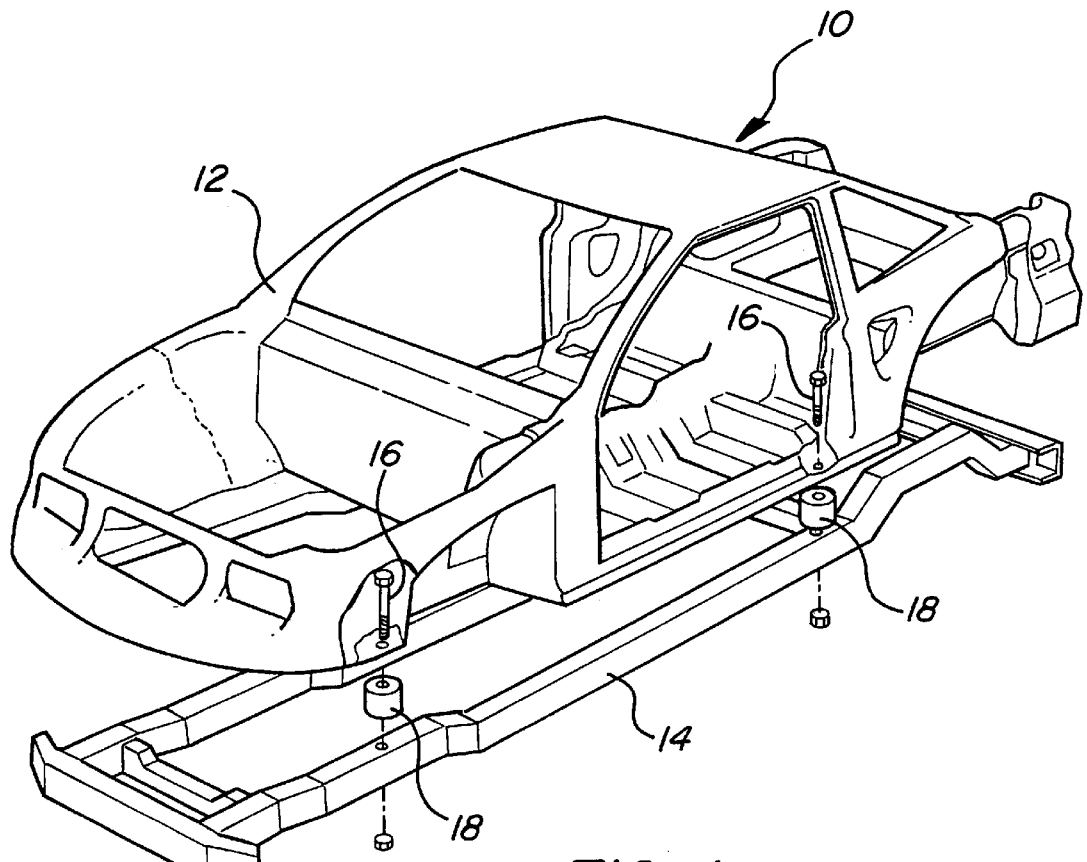
FIG. 1 is a perspective partially exploded view of a typical body-on-frame vehicle.
Figure 2:
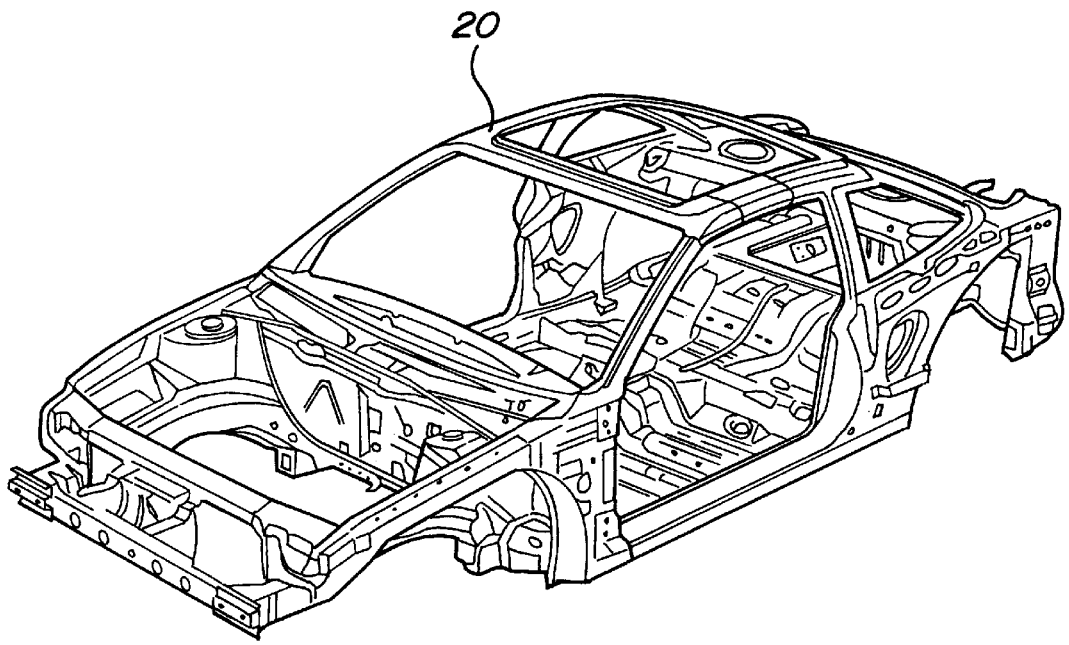
FIG. 2 is a perspective view of a unitized body vehicle.
Figure 3:
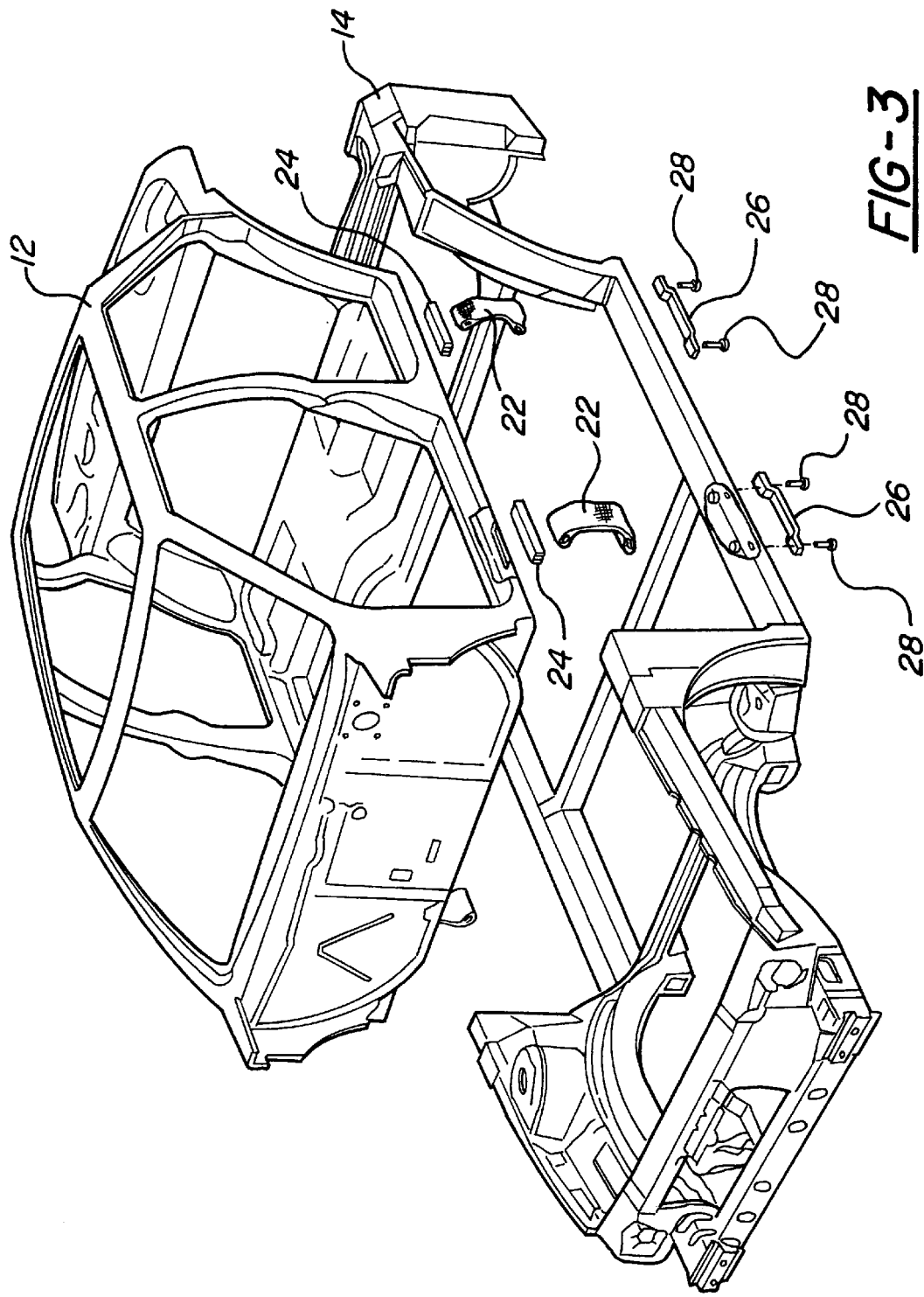
FIG. 3 is a perspective partially exploded perspective view of the apparatus of the present invention in use with a body-on-frame vehicle.

Turning first to FIG. 3, the apparatus of the present invention is shown. Body 12 is secured to frame 14 with a plurality of impact reduction means 22 connected at one end to the body and at the other end to the frame. In the preferred embodiment, at the body end, impact reduction means 22 wraps around a constant area section of extrusion 24 of body 12. In the preferred embodiment, at the frame end, impact reduction means 22 wraps around arm 26 which is bolted via bolts 28 to the underside of frame 14. Any suitable attachment scheme may be used, however, to connect the securing means to the body at one end and to the frame at the other.

Figure 4:
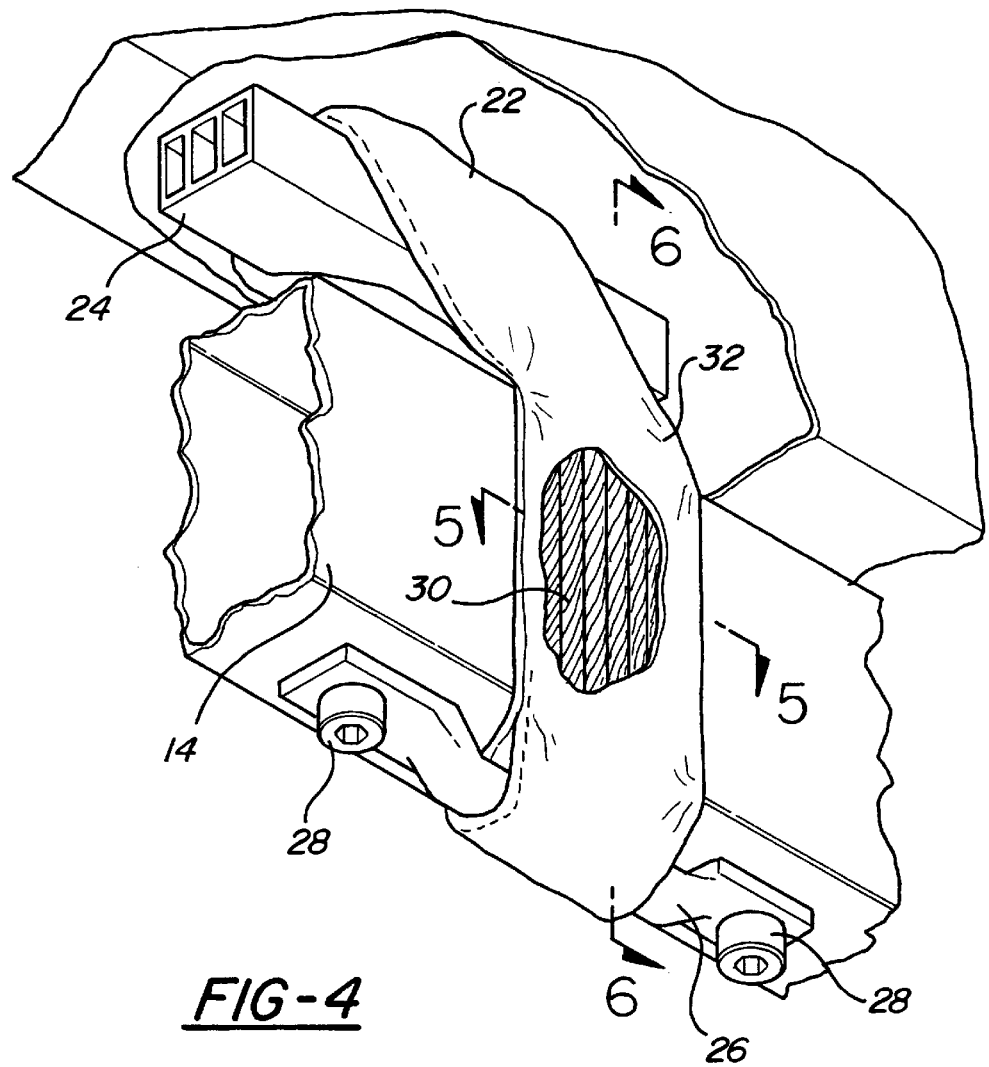
FIG. 4 is a detailed perspective view of one embodiment of the apparatus of the present invention in use with a body-on-frame vehicle.
Figure 5:
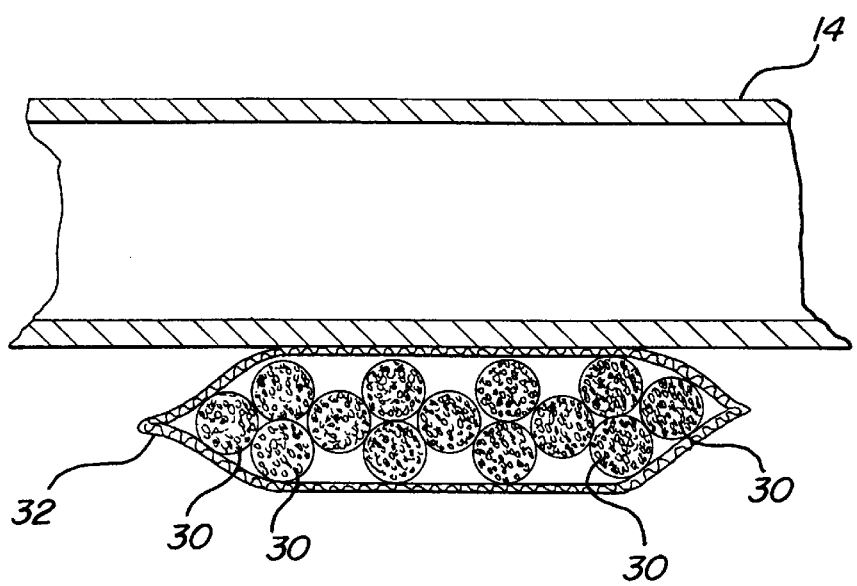
FIG. 5 is a cross-sectional view taken at line 5—5 of FIG. 4.
Figure 6:
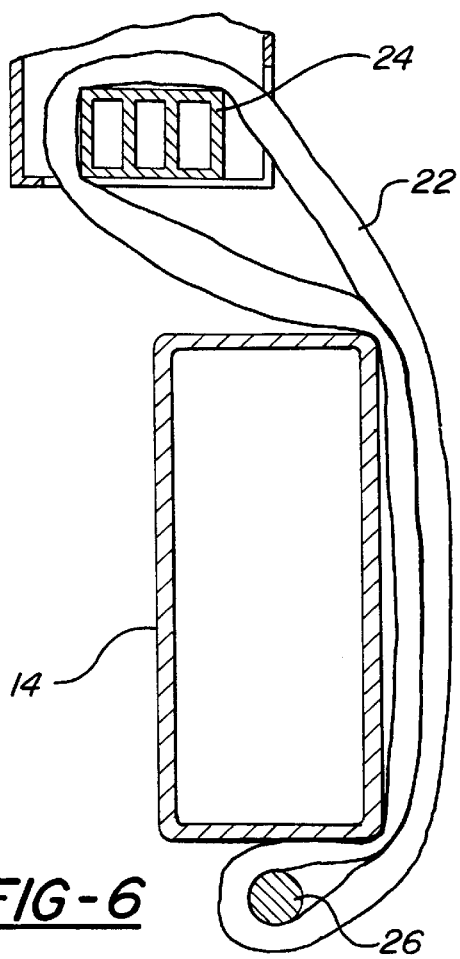
FIG. 6 is a cross-sectional view taken at line 6—6 of FIG. 4.

Turning to FIG. 4, FIG. 5, and FIG. 6, a first embodiment of impact reduction means 22 can be seen. In this embodiment the securing means comprises a length of biaxially or uniaxial oriented polymer cord 30 which is wrapped in multiple loops around extrusion 24 and arm 26, and which for protection is encased in sheath 32. U.S. patent application Ser. No. 08/624,676, filed Apr. 15, 1996 and assigned to a common assignee, describes the use of oriented polymer fibers for dynamic side impact and frontal impact, and is hereby incorporated by references. The ends of cord 30 are braided together after wrapping to secure them together. Sheath 32 is sewn in place around cord 30 after it is installed. The preferred material for the cord is Kevlar™, which is used because it is capable of withstanding the high temperature (in excess of 400° F.) typically associated with coating a vehicle. Any uniaxially or biaxially oriented polymer fibers such as polyethylene, polypropylene, nylon, polyesters and others, can be used, however, a material other than Kevlar™ is preferred when high temperature is not a consideration because Kevlar™ is expensive.

Figure 7:
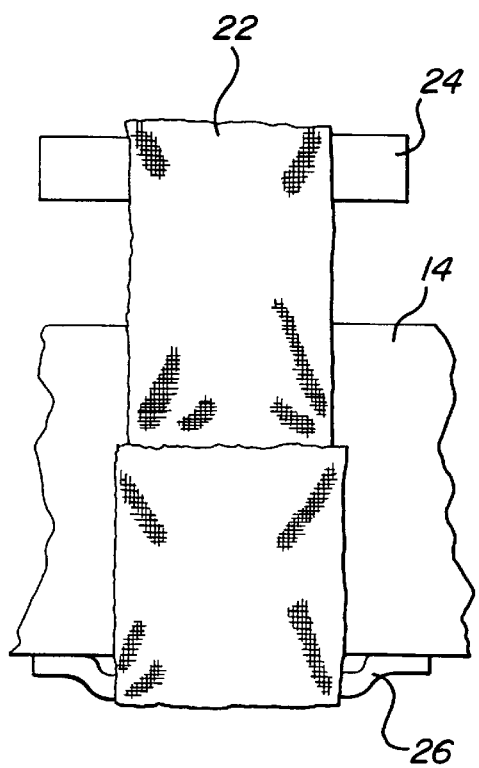
FIG. 7 is a detailed side view of a second embodiment of the apparatus of the present invention in use with a body-on-frame vehicle.
Figure 8:
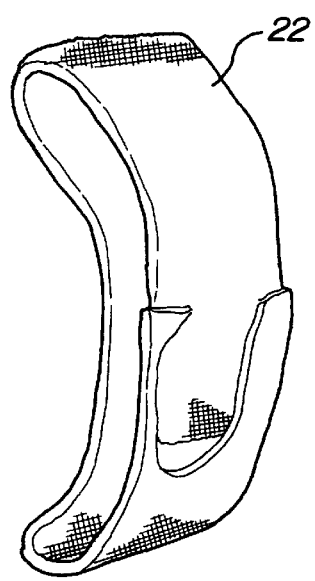
FIG. 8 is a perspective view of the embodiment of the securing means shown in FIG. 7.
Figure 9:
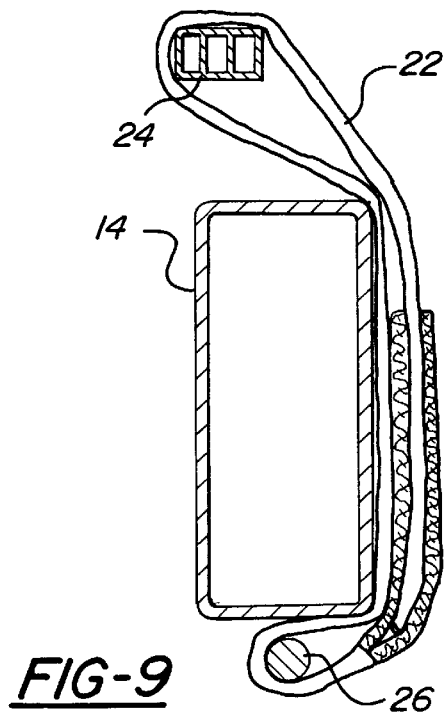
FIG. 9 is a cross-sectional view of the second embodiment of the securing means of the present invention.

A second embodiment of the securing means of the present invention is shown in FIG. 7, FIG. 8, and FIG. 9. In this embodiment, impact reduction means 22 comprises a hollow sleeve 22 of braided polymer fibers, and again, preferably of Kevlar™ fibers, which is self-securing by looping within itself a sufficient amount, such that the inside of the leading section of the sleeve engages with the outside of the following section, as is shown in FIG. 8. Sleeve 22 is secured by looping around extrusion 24 and leg 26 and by sliding one end of the sleeve over the other end until there is sufficient overlap such that the contact between the inner and outer surfaces of the sleeve secure the sleeves. An overlap of one and a half times the length of the sleeve is preferred.

In either case, at impact, a tensile load is applied along the longitudinal axis of the securing member. The securing member takes up the energy in a nonreversible manner and absorbs forces in an impact situation. Chrysler in testing was able to reduce the "g" forces at impact to less than 90 g's using the present invention with Kevlar™ securing members. Steel securing members used in the same manner resulted in impact forces of over 150 g's. Most preferably four such members are used to connect the body and the frame, but at least one per side is preferably used, located at approximately the A and B pillars of the vehicle.

Obviously, many variations and modifications of the present invention are possible in light of the above teachings. It is, therefore, to be understood that within the scope of the appended claims, the invention may be practiced otherwise than as specifically described.

We claim:

1. A motor vehicle comprising:

a body;

a frame; and at least one arrangement for reducing side impact forces, said at least one arrangement comprising a plurality of polymer cords, said at least one arrangement secured at one end to said body and at the other end to said frame, each polymer cord being constructed of Kevlar™.

2. The motor vehicle of claim 1, wherein said at least one arrangement further includes a self-securing sleeve.

3. The motor vehicle of claim 1, wherein said at least one arrangement further includes a sheath surrounding said plurality of polymer cords.

4. The motor vehicle of claim 1, wherein each polymer cord of said plurality of polymer cords vertically extends between said body and said frame.

5. The motor vehicle of claim 1, wherein said at least one arrangement defines a continuous loop.

6. The motor vehicle of claim 5, wherein said continuous loop surrounds a portion of said frame and said continuous loop surrounds a portion of said body.

7. The motor vehicle of claim 1, wherein said at least one arrangement comprises a plurality of arrangements for reducing side impact forces.

8. A motor vehicle comprising:

a body;

a frame; and an arrangement for reducing side impact forces, said arrangement comprising a flexible cord vertically extending between said body and said frame, said arrangement secured at one end to said body and at the other end to said frame.

9. The motor vehicle of claim 8, wherein said arrangement further includes a self-securing sleeve.

10. The motor vehicle of claim 8, wherein said arrangement for reducing side impact forces further includes a sheath surrounding said flexible cord.

11. The motor vehicle of claim 8, wherein said flexible cord forms a continuous loop extending about a portion of said body and a portion of said frame.

12. The motor vehicle of claim 8, wherein said flexible cord is wrapped in multiple loops about a portion of said body and a portion of said frame.

13. The motor vehicle of claim 8, wherein said flexible cord is constructed of a polymer.

14. The motor vehicle of claim of 8, wherein said flexible cord is constructed of Kevlar™.

15. A method of constructing a motor vehicle for reducing side impact forces, the method comprising the steps of:

providing a body;

providing a frame;

providing an arrangement for reducing side impact forces having first and second ends;

securing said first end of said arrangement for reducing side impact forces to said body; and securing said second end of said arrangement for reducing side impact forces to said frame;

said arrangement including a flexible cord vertically extending between said body and said frame.

16. The method of constructing a motor vehicle of claim 15, further comprising the step of wrapping said flexible cord in multiple loops about a portion of said body and a portion of said frame.

17. The method of constructing a motor vehicle of claim 15, further comprising the steps of:

providing a sheath; and surrounding said flexible cord with said sheath.

18. The method of constructing a motor vehicle of claim 15, further comprising the steps of:

providing a self-securing sleeve; and surrounding said flexible cord with said self-securing sleeve.

19. The method of constructing a motor vehicle of claim 15, wherein said flexible cord is constructed of Kevlar™.

20. The method of constructing a motor vehicle of claim 16, further comprising the step of coating said motor vehicle at a temperature in excess of 400° F. after the step of wrapping said flexible cord in multiple loops about a portion of said body and a portion of said frame.

* * * * *